(12) United States Patent
Chavarria Gutierrez

(10) Patent No.: US 11,977,661 B2
(45) Date of Patent: May 7, 2024

(54) SYSTEM FOR GENERATING A DIGITAL HANDWRITTEN SIGNATURE USING A MOBILE DEVICE

(71) Applicant: Muuk Technologies, S. De R.L. De C.V., Mexico City (MX)

(72) Inventor: Carlos Eduardo Chavarria Gutierrez, Mexico City (MX)

(73) Assignee: Muuk Technologies, S. De R.L. De C.V., Juarez (MX)

( * ) Notice: Subject to any disclaimer, the term of this patent is extended or adjusted under 35 U.S.C. 154(b) by 246 days.

(21) Appl. No.: 17/434,858

(22) PCT Filed: Jun. 9, 2020

(86) PCT No.: PCT/MX2020/050009
§ 371 (c)(1),
(2) Date: Aug. 30, 2021

(87) PCT Pub. No.: WO2021/010811
PCT Pub. Date: Jan. 21, 2021

(65) Prior Publication Data
US 2022/0164480 A1 May 26, 2022

(30) Foreign Application Priority Data
Jul. 12, 2019 (MX) .................. MX/a/2019/008404

(51) Int. Cl.
*G06F 21/64* (2013.01)
*G06F 21/32* (2013.01)
(Continued)

(52) U.S. Cl.
CPC .............. *G06F 21/64* (2013.01); *G06F 21/32* (2013.01); *G06F 21/602* (2013.01); *G06F 21/6209* (2013.01)

(58) Field of Classification Search
CPC ........ G06F 21/64; G06F 21/32; G06F 21/602; G06F 21/6209; H04L 9/3231; H04L 9/3247; H04L 9/3268
See application file for complete search history.

(56) References Cited

U.S. PATENT DOCUMENTS 6,839,453 B1 1/2005 McWilliam et al.
8,056,822 B2 11/2011 Bourrieres
(Continued)

*Primary Examiner* — Michael R Vaughan
*Assistant Examiner* — Ethan V Vo
(74) *Attorney, Agent, or Firm* — Defillo & Associates, Inc.; Evelyn A. Defillo

(57) ABSTRACT

The present invention discloses a method, a system and a computer-readable medium so that a user, by using a mobile device containing an interface, can perform the signature of documents by a digital handwritten signature, this signature states that full legal value and documentation can be signed from Fin Tech companies, banks, insurers, customs and foreign trade agencies, marketers, lessors, and companies with legal certainty needs in mobile and virtual environments, where the mobile device through the interface notifies at least one user that they have a document to sign, document signature processing is performed by verifying the identity of the user by an identification document, and finally processes the signature and verifies the user's identity to the check, by facial biometry, a photo obtained by the mobile device with the photograph of the user identification document.

9 Claims, 9 Drawing Sheets

(51) Int. Cl.
 *G06F 21/60* (2013.01)
 *G06F 21/62* (2013.01)

(56) References Cited

U.S. PATENT DOCUMENTS

| | | |
|---|---|---|
| 8,780,383 B2 | 7/2014 | Vendrow |
| 9,313,032 B2 * | 4/2016 | Oswalt .................. H04L 63/123 |
| 10,855,473 B1 * | 12/2020 | Griffin .................. H04L 9/3297 |
| 2005/0166053 A1 | 7/2005 | Cui et al. |
| 2012/0093409 A1 | 4/2012 | Sarnoff |
| 2012/0228459 A1 | 9/2012 | Weinstein |
| 2013/0050512 A1 | 2/2013 | Gonser et al. |
| 2014/0214698 A1 | 7/2014 | Dejene |
| 2015/0063626 A1 * | 3/2015 | Martin ............... H04N 1/32304 382/100 |
| 2015/0199780 A1 * | 7/2015 | Beyk ...................... G06Q 10/00 705/310 |
| 2016/0011770 A1 | 1/2016 | Princen et al. |
| 2016/0148039 A1 * | 5/2016 | Potash ............... H04L 63/0861 382/119 |
| 2017/0250820 A1 * | 8/2017 | Raduchel ............ G06F 21/6272 |
| 2017/0272249 A1 * | 9/2017 | Bhandarkar .......... H04L 9/3247 |
| 2018/0152297 A1 * | 5/2018 | Fielding ................ H04L 9/3236 |
| 2018/0176017 A1 | 6/2018 | Rodriguez et al. |
| 2019/0342096 A1 * | 11/2019 | Starosielsky ....... H04L 63/0428 |

\* cited by examiner

SYSTEM FOR GENERATING A DIGITAL HANDWRITTEN SIGNATURE USING A MOBILE DEVICE

CROSS REFERENCE TO RELATED APPLICATION

This application is a national stage entry of PCT/MX2020/050009 filed Jun. 9, 2020, under the International Convention and claiming priority over Mexican Patent Application MX/a/2019/008404 filed Jul. 12, 2019.

TECHNICAL FIELD

The present invention belongs to the technical field of communications, specifically to the field of communication of mobile devices in conjunction with computer systems and document security, and more specifically with the signing of documents in digital form and security in communication to ensure the integrity of the document.

BACKGROUND

Currently, the development of electronic commerce and the exchange of properties between different sectors of society, makes it necessary to make agreements or close contracts, which the conventional way is signing paper documents, a fact that has been carried out since ancient times. cultures and has been maintained throughout the years, however, with technological evolution, there are known ways to carry out the document signing process, in such a way that it shows an alternative way to sign documents and thus have advantages over the traditional way of signing a document.

Considering the above and observing the state of the art, patent document U.S. Pat. No. 6,839,453 has been found which describes a system and method to authenticate a signature in an originally signed article, which uses at least one camera to capture an image of a person when the article is signed. In one embodiment, the image is a real-time video image, and in another embodiment, the image is a still photo. The images associated with the signed article, so that the owner of the article has a mechanism to authenticate the signature. Preferably, the signed article has a unique identifier located therein, and the image is preferably edited to include that identifier as well. A souvenir kit is also provided, containing an originally signed item, a storage medium that stores a captured image of an original signing event associated with the item. In addition, a captured image and the indicative data of the signed article are stored electronically in association with each other, such as on a storage medium available to a holder of the signed article, or in a database that can be accessed remotely.

Another related document is patent application US 2013050512 A1; this document describes the techniques for signing electronic documents initiated by the signatory through an electronic signature service using a mobile device or other client device. Embodiments for example are providing an electronic signature service ("ESS") configured to facilitate the creation, storage and management of documents and corresponding electronic signatures. In some embodiments, when a signing user receives a hard copy (e.g., a signing document), the signer may capture an image of the signing document with a camera on a mobile device. The signer can import the image captured in the ESS for signature, storage and/or transmission to other parties.

Also, the patent application US 2012284591 A1 describes systems and methods for the electronic identification and signature of electronic documents. Certain embodiments of the present invention provide a virtual signature tool for creating a unique and verifiable electronic signature (SigCode) to sign documents using an individual's mobile device. In some embodiments, document identifiers (e.g., QR codes) can be used to identify and retrieve documents for the digital signature. For example, by scanning another document identifier, an electronic version of the document (for example, an exemption) can be retrieved from a server. The electronic document can be displayed on the user's mobile device (for example, through a web page). Then, the user can review the electronic document, complete the required information, and sign the document with an electronic signature generated by the electronic signature tool.

Another document is patent application US 2012093409 A1 which describes computer readable systems, methods and means for capturing a signature and placing a representation of the captured signature in the appropriate field of a document. A camera or other appropriate sensor can capture an image of a signature provided by a user on paper. The signature can be digitized to create a representation that a device can use in a displayed document. To determine where to place the representation, a horizontal line of a document can be identified by selectively representing portions of the document adjacent to an input position and identifying one or more limits for a detected horizontal line. The representation can be scaled to fit a detected field in the document.

U.S. Pat. No. 8,780,383 B2, describes a fax document that can be uploaded to a fax server on a vPBX network or dynamically generated. For dynamic generation, preconfigured templates can be stored on a mobile device or on a fax server. A user can use a mobile device connected to a vPBX network as a control device to direct the generation of faxes on a fax server. Fax generation can be customized based on the geographic location of the mobile device. The generated fax can be downloaded to a mobile device. The user can digitally sign the fax using a touch screen input device on the mobile device. The digitally signed fax can be transmitted to a destination device.

Patent application US 2005166053 A1 describes a method, apparatus and system that are aimed at associating the signature of a device with a mobile device. The invention is configured to determine at least one level of confidence associated with the mobile device and an associated carrier gateway. In one embodiment, the mobile device may have multiple levels of trust associated with it. A confidence level can be determined based on whether the mobile device provides a device identifier. Another level of trust can be determined based on whether the mobile device is configured to receive a cookie. A third confidence level can still be determined based on a dynamic session identifier. The confidence level can also be determined based, in part, on a confidence associated with the operator gateway.

U.S. Pat. No. 8,056,822 B2 describes a method for certifying and subsequently authenticating original physical or digital documents. The concept of evidence is based on the dual nature of a physical information element and a digital information element, one of which is the reference for the other that cannot be modified with the risk of losing the evidence. For a physical original document (8) associated with a bubble seal (7), there is a proprietary paperless reference counterpart with corresponding date and time. For a patented original digital document, time-stamped (15), there is a corresponding reference counterpart in the form of a bubble seal (7)

U.S. Pat. No. 6,839,453 B1, which describes a method and system for providing owners, potential buyers, and other users of autographed items, such as sporting goods and other entertainment memorabilia, with visual evidence to verify the authenticity of the autograph. A method of the present invention involves capturing an image of the signature when placed on the article. The image thus captured is stored on a computer readable medium. In addition to the item itself, the item owner may be provided with a computer-readable medium containing computer-readable instruction for accessing the image and other information about the item, the signing process, the autograph, etc. The image can be captured by a camera mounted on a pen or other writing instrument.

The technology that is currently available, gives us the possibility of modifying the traditional way of signing autographs to close agreements or contracts, in such a way that when making use of mobile devices and communication networks, the present invention is made, the which overcomes the problem of being able to perform the autograph signature directly on the mobile device, in such a way that the integrity of the signed document is guaranteed.

OBJECT OF THE INVENTION

An objective of the present invention is to provide a security system that allows us to carry out a digital autograph signature. This new digital autograph signature avoids the identity theft of the signer, this by means of an interface found on a mobile device, the which, when a user wants to make a digital autograph signature, he does it through this interface, which activates the activation function of the video camera and makes a video of the moment the signature is being made on the same device mobile, in which, through said interface, a field is enabled that is displayed on the screen where the user can trace his signature, which is embedded in the video and that when processing the data, the document is generated in PDF in which the user's signature is incorporated as if they had actually signed directly on paper. To guarantee the integrity of this process, different stages or steps are carried out with which the security of the information is maintained.

Another objective is to implement a method, which is carried out by means of a mobile device, and which is responsible for activating an interface on the mobile device so that a user can perform a digital autograph signature and obtain a PDF document with the autograph signature. The method activates an interface on the mobile device to trace the signature on the mobile device, also implementing the necessary steps with which the security of the information is guaranteed.

A further objective is that of a computer-readable medium which contains the steps of a method for a user to perform a digital handwriting signature on a mobile device, where the method activates an interface on the mobile device allowing the user to trace his signature and the mobile device captures said signature while taking a video of the user signing, so that, at the end of the process, the user can have the document signed in PDF format. This is done incorporating security steps or steps to preserve the integrity of the process.

SUMMARY OF THE INVENTION

The present invention describes a system to generate digital autograph signatures by means of a mobile device, the system consists of different components that when integrated, a document with the autograph signature is obtained, this system comprises an interface that is incorporated in a mobile device, and through the interface already incorporated in the mobile device, can obtain the document that they want to sign, this is done by means of a QR code or link that is received by means of a message on the mobile device.

Once the user decides to sign the document obtained by the QR code or the link, then the interface on the mobile device displays a field in it so that the user can trace the signature with his finger, while the interface activates the camera of the mobile device and the image of the user is observed on the screen, and thus two videos are generated, one of the image of the user tracing his signature on the screen of the mobile device, and another video when the user performs a reading of the signature conditions. With the videos obtained in this way, the security process is integrated, for which the interface of the digital autograph signature encrypts and sends the data to the servers of the institutions that are part of the security check and also of the institution generated by the document. Additionally, the digital autograph signature system adds two security mechanisms, and sends copies of the signed document to the parties.

Also described is a method in a system for generating digital autograph signatures on a mobile device, whereby the method is to incorporate an interface on a mobile device; obtain the document to be signed by means of a QR code or a link, which are received by means of an MSM message on the mobile device, a user, by means of the mobile device, traces his signature on the screen of the mobile device, so that the signature can be processed later. The digital handwriting signature interface is in charge of encrypting the information, sending it to the computer servers of the institutions that are part of the system's security, and as a security measure, all the information that was processed in the device, finally the digital autograph signature system adds two additional security mechanisms to the file and also sends a copy of the signed document to the parties.

Additionally, a computer-readable medium is described, which contains the steps to be able to incorporate the interface into a mobile device, to subsequently obtain the document to be signed either by means of a QR code or a link obtained from a SMS message to the mobile device, to later activate the interface of the mobile device and make two videos of the user tracing their signature on the screen of the mobile device and, of the reading of the content of the signed document, for example, of the mobile device, and with this, to be able to send by means of the mobile device and according to the indications of the digital autonomous signature system, encrypts the information and is sent to the servers for validation and conservation, deleting all content from the mobile device.

DESCRIPTION OF THE INVENTION

Reference will now be made to details of the exemplary modalities, which are illustrated in the accompanying drawings. The implementations that are described of the exemplary embodiments do not represent all the implementations contained in the present description, these are simply examples of apparatus and methods consistent with aspects related to the present description as indicated in the appended claims. The terminologies used in this specification are only to describe particular embodiments, but not to limit the present description.

Figure 1:
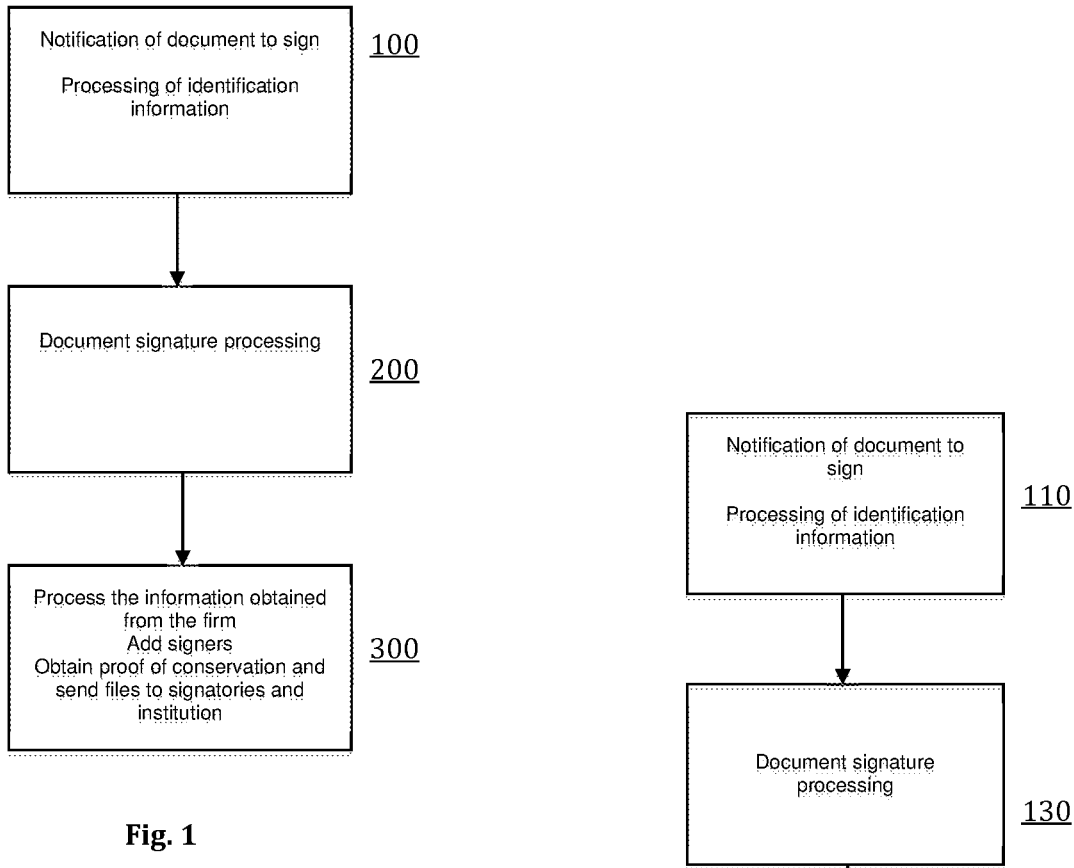
FIG. 1. Shows a general flow diagram of the system.

FIG. 1 shows the flow diagram of the method to perform the digital autograph signature, said method is implemented on a mobile device of a user who is interested in signing some document digitally, this through an interface and that is carried out in step (100), where a verification is made that the interface is available on the mobile device, that in the event that the interface is found then a notification can be received to sign a document, once it is confirmed that the digital autograph signature is desired, then the identification information is processed.

Subsequently, in step (200), the processing of the digital autograph signature is carried out, which is carried out with the user's finger and, in addition, a video of the moment in which the signature is traced on the screen of the mobile device is made, this as one of the security measures, also making another video in which the user's reading of the document they have signed is recorded, so this feature defines part of the security of the document signature.

In step (300) the final part of the process is carried out, in which the data that was obtained through the mobile device is sent to the servers that will guarantee the authenticity of the signature, so at this stage the information obtained is processed, it is verified if there are other additional people who must sign the document, so in the event that other people must sign, then these signatures are made and subsequently added two additional security mechanisms, with which they consist of adding a Hash and a Timestamp to the generated files, obtaining proofs of conservation and sending them, the files to the signing user and the institution to which it is signed. Where these institutions are found among others such as FinTech companies; banks, in which it is ideal for origination, acquisition and placement processes, with this digital autograph signature you can sign: contracts, instructions, orders, payments, applications, among other documents; insurers, in which it applies to any type of insurance, and allows you to sign applications, claims, reimbursements, provider services and more; customs and foreign trade agencies; marketers; lessors; as well as companies with needs for legal certainty in mobile and virtual environments, such as brokerage houses, where contracts, instructions, orders, requests, withdrawals, etc. can be signed.

Figure 2:
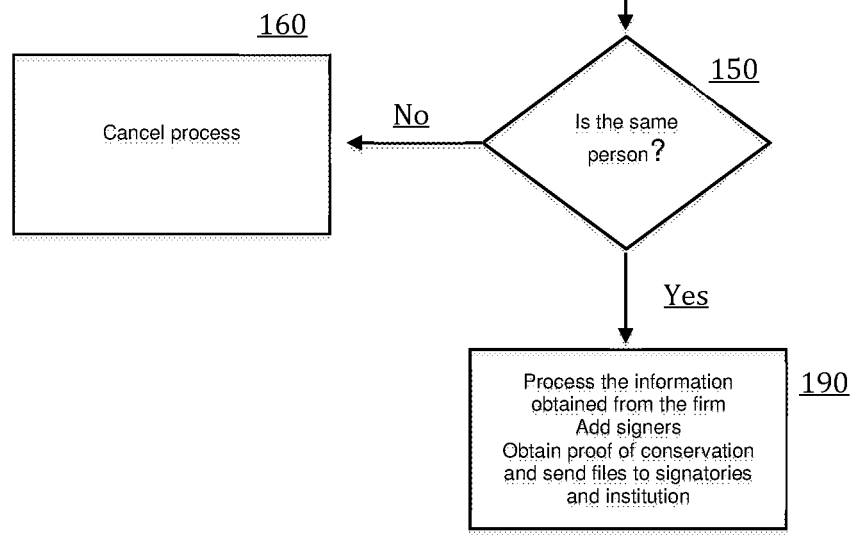
FIG. 2. Shows a flow diagram corresponding to obtaining the information.

FIG. 2 shows the flow chart corresponding to obtaining the information from step (100) of FIG. 1, where step (110) is carried out the notification to the user of the mobile device that has a document in waits to perform the digital autograph signature, where upon acceptance, stage (130) is performed, in which the personal information processing of the user is carried out to determine if it is really who should perform the document signature, for this it is determined in step (150) if the person who finds the mobile device is the same person who must perform the digital autograph signature, so if the result of this determination is that it is not the same person, then the process is canceled, however, in the event that it is determined that if it is the same person, then the information is validated and stage 200 is carried out in FIG. 1.

Figure 3:
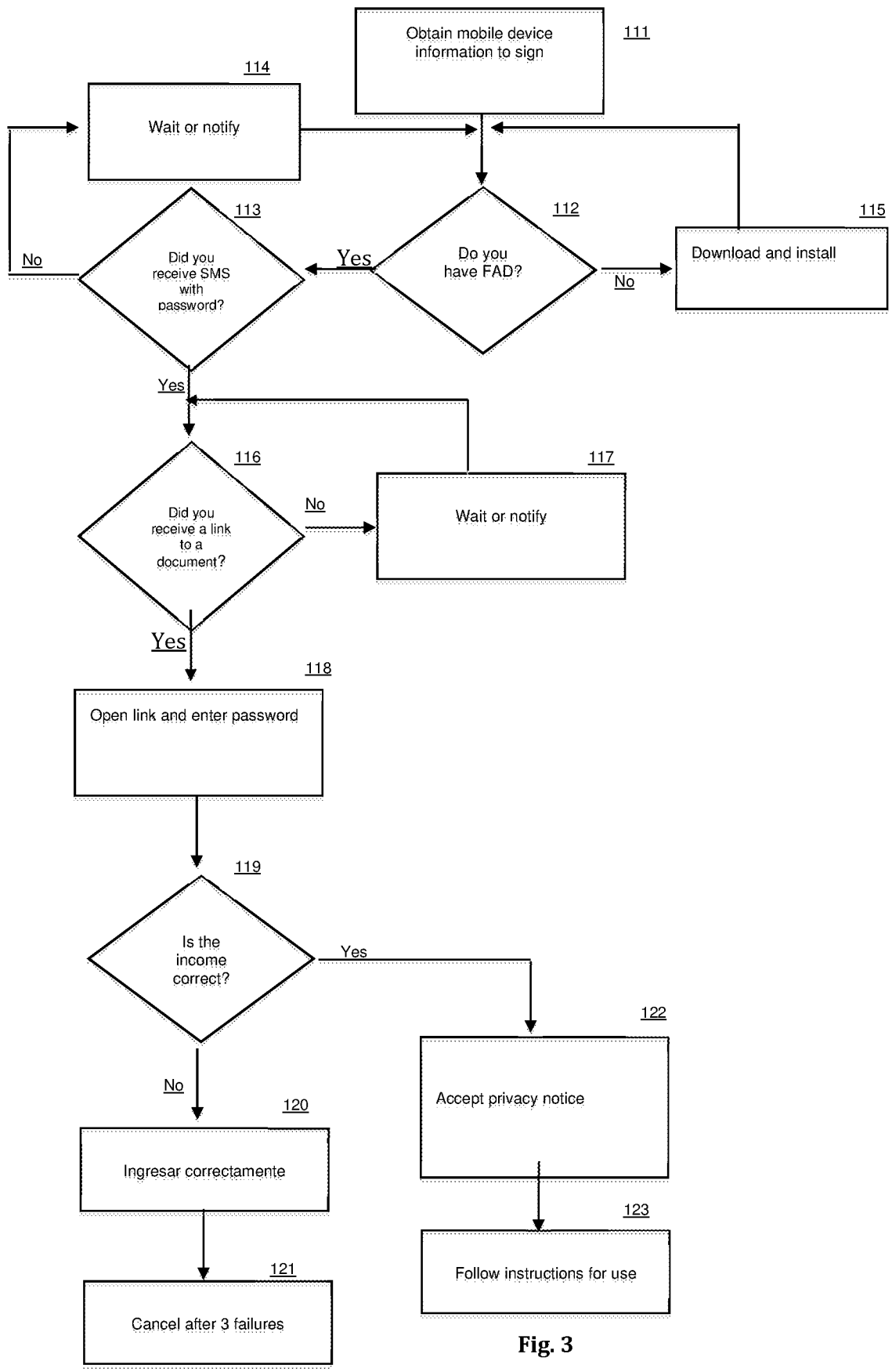
FIG. 3. Shows a flow chart modality to obtain the document to sign.

FIG. 3 shows an embodiment of the flow chart so that the user of the mobile device can obtain the document to be signed, in such a way that step (111) obtains the information from the mobile device in order to determine that the interface to carry out the digital autograph signature is performed properly, so in step (112) it is determined whether the interface is available to perform the digital autograph signature on the device mobile device, that in the event that said interface is not available, then step (115) is performed, in which the interface is downloaded and installed.

When said interface is available on the mobile device, then in step (112) it is determined that, if the interface is available, step (113) is now being performed, where it is determined that, if an SMS-type message has been received with the key to obtain the document to be signed, if in this determination the message is not available, then step (114) is carried out, in which the SMS-type message is expected or notified. In the event that in step (113) it is determined that if you have the message, then in step (116) it is determined if a link to a document has been received, which is done to verify if the user has already it has the document to be signed, which in the event that the document is not available, then in step (117) a time is kept waiting to verify if at that time the link to the expected document is made or a notification to inform that said document has not been received, in order to go back to step (116), where in the event that there is a link to the document to be signed, then step (118) is carried out.

In step (118), the user can through the mobile device have access to the expected document, for which he opens the received link and enters the access key to have the document on the mobile device, once it has been made step (118), it is determined if the entry is correct, which is carried out in step (119), which in the event that it has not been entered correctly, step (120) is carried out, in which the opportunity to make the attempt to capture the data again to be able to enter correctly, and if for some reason the entry could not be made properly, step (121) is performed, where the process is canceled after three attempts to obtain the document to sign. In the event that in step (119) it is determined that the entry has been correct, then step (122) is performed, in which the user accepts the privacy notice, and later in step (123) The interface displays a series of instructions that the user must follow in order to use the interface and perform the digital autograph signature.

Figure 4:
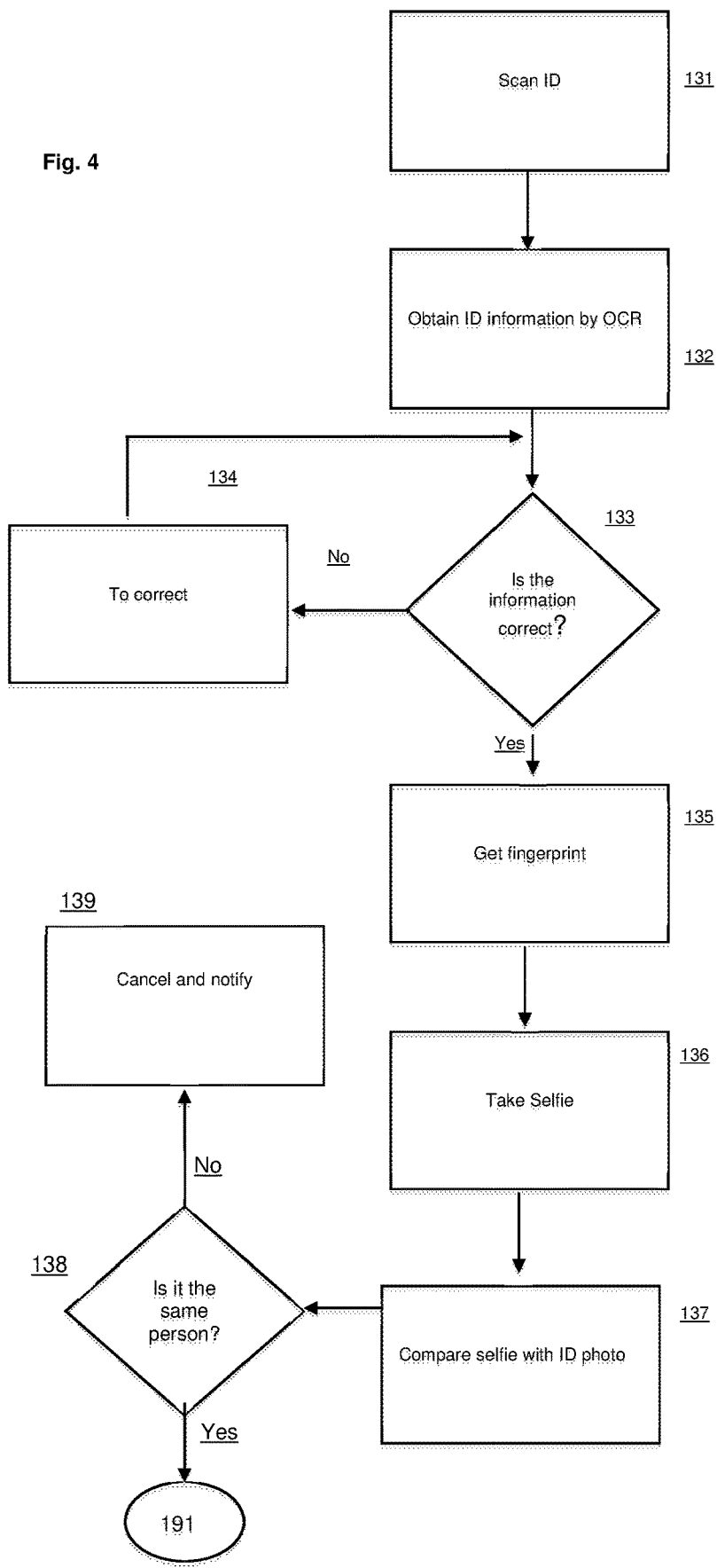
FIG. 4. Shows a flow diagram of the process to obtain the identity of the user.

FIG. 4 shows a flow diagram of the process to obtain the identity of the user who wants to sign the document, this is a security measure to prevent spoofing and thus prevent a third person from signing on behalf of the interested party, such that after performing step (123) (of FIG. 3), step (131)

is performed in which the user is asked to use the mobile device, when using the interface for digital autograph signature, to scan your photo identification (ID), which could be for example the INE credential. Once the step of scanning the user ID has been performed, then step (132) is performed, in which the DAS interface obtains the user ID information, which was processed by means of a characters (OCR) and thus be able to determine in step (133) if the information is correct, when the information is not correct, then it returns to step (133) again, passing through step (134) where it is brought to correct the information, in order to determine if the information is correct, this in order to perform the user ID scan again.

Figure 5:
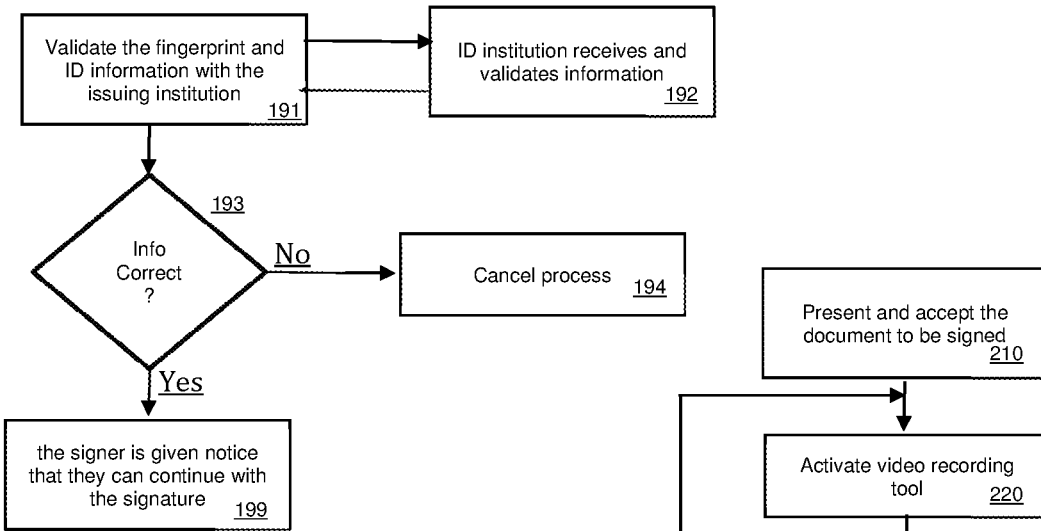
FIG. 5. Shows a flow diagram to identify the user.

When the information is determined to be correct, then step (135) is carried out, in this step the user's fingerprint is obtained through the interface on the mobile device, while in step (136) the indicates the user to take a selfie, this in order to identify if the user is actually the same person as the ID that was scanned in step (131), and with which the process of identification to be able to carry out the digital autograph signature of the document, for finally in step (137) a comparison is made of the selfie that has just been obtained with the photograph of the user ID document obtained in step (131), finally in the step (138) it is determined if the person who has been identified by means of the selfie is the same as that of the ID document, in the event that it is not the same person, then step (139) is performed where it is canceled the process and it is advised that the person or is the same, while that in the event that the person is the same, then the process continues in step (191) of FIG. 5, in such a way that with the processing of this information step (150) of the FIG. 2.

FIG. 5 shows a flow diagram with which the user who intends to sign the document is identified, which is performed by determining in step (150) of FIG. 2 that the person who wants to sign the document is the same person who has identified himself with the ID he has provided, so that when it is determined in (150) that if he is the same person, then step (191) is carried out, where a validation of the fingerprint and the ID information of the user with the issuing institution, whereby the mobile device establishes a communication to a server of said institution, whereby the ID institution receives said information provided by the mobile device and the validates, this is carried out in step (192).

Once the institution that issued the user ID validates the information, it returns it to the mobile device in which, through the interface, step (193) is performed, in which it is determined that said information is correct, which in if it is not correct, then in step (194) the process is canceled. On the other hand, in the event that the information is correct, then step 195 is carried out, in which the signing user is notified that they can continue with the signature.

Figure 6:
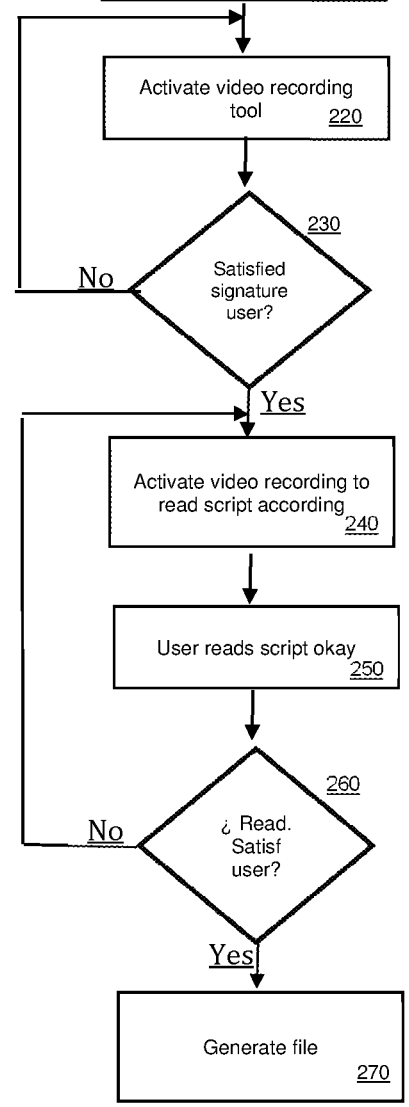
FIG. 6. Shows a flow diagram to obtain the signature videos.

Once the validation of the information of the signing user has been carried out, then the process to sign the document is carried out. In this way, FIG. 6 shows a flow chart for signing the document in which the videos of the moment of signing are incorporated, so step (210) shows the stage in which the user is They present you with the steps that you must follow to make the signature as well as the document to be signed, this through the DAS interface, so later in step (220) a tool of the mobile device is activated to be able to make a video recording, and then in step (230) determines if the user is satisfied with the signature made, in case he is not satisfied, then he returns to step (220) to repeat the process. But if (230) the user is satisfied, then in step (240), the video recording tool is activated again and the user is asked to place himself in front of the screen at the same time as he is shown a text that must read loud and clear, where the text read commits the user to comply with the agreement they are acquiring in the document (agreement script), so in step (250) the user reads the text of the agreement script while the interface captures the video corresponding to said reading. Once the reading is done, step (260) determines if the user is satisfied with the recorded video, which in case he is not satisfied, then he returns to step (240) to repeat the process again, when the user is satisfied after determination in step (260), then step (270) is performed, which is where the DAS interface performs the process of generating the corresponding files.

Figure 7:
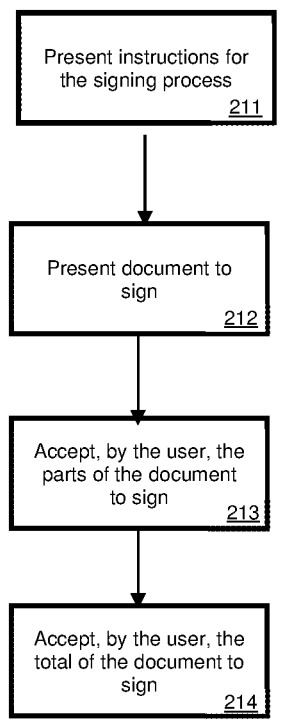
FIG. 7. Shows a flow diagram to show the document to sign.

FIG. 7 shows a flow chart by means of which the steps are carried out to show the document to be signed, in this way, in step (211) it is carried out when developing step (210) of FIG. 6, therefore, the step (211) is generated from the result of the step (195) of FIG. 5, where, through the interface, the user was notified that he could perform the signature, then in step (211) It will present the user with the steps that must be carried out in order to make the digital autograph signature on the desired document, and once the user knows the steps to be performed, step (212) then develops it to the user. the document to sign, for later on in step (213) the parts of the document to be signed are shown, which the user accepts by giving the DAS tap interface to the sections where his signature is required, finally in the stage (214) the user accepts the entire document to be signed by tapping at the end of the document.

Figure 8:
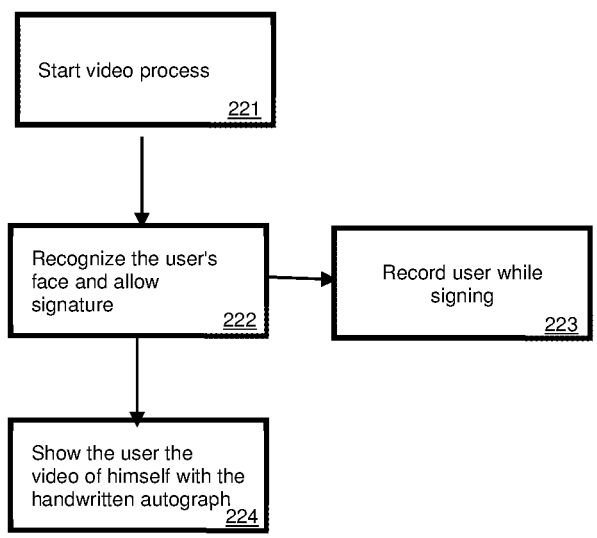
FIG. 8. Shows a flow chart to perform an autograph signature.

At the end of step (214), one proceeds to step (220) of FIG. 6 and when performing step (220), which in FIG. 8 shows the steps corresponding to the process of activating a tool for video recording, by therefore after performing step (214) of FIG. 7, step (221) of FIG. 8 is carried out, where the process of the video recording tool is started, with which the videos are to be taken for the corresponding signature of the document to be signed, so once the video process has started, step 222 is performed in which the user is asked to place himself in front of the screen of the mobile device to recognize the face of the user, when the face has been identified, then the DAS interface allows the user to perform his autograph signature as that of the ID document that I present in (131) of FIG. 4, at the same time that the user traces his autograph signature on the screen, the mobile device records in step (223) the user in video while signing on the screen of the mobile device, so after finishing the signature, the interface shows the user the video of himself with the handwritten autograph on the mobile device, which is carried out in step (224), in order to continue in step (230) of FIG. 6.

Figure 9:
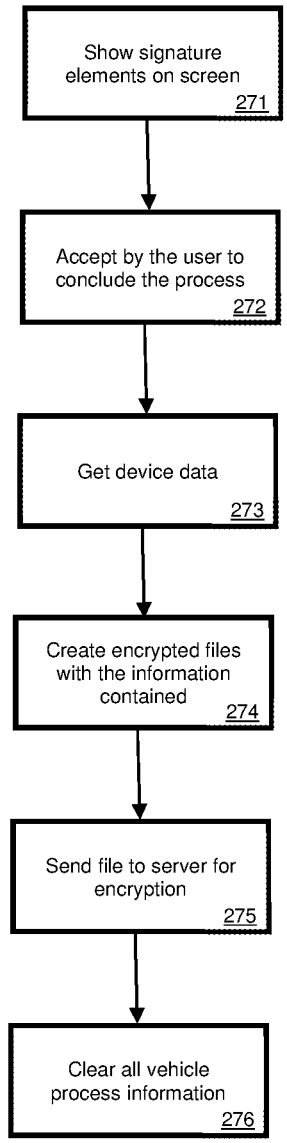
FIG. 9. Shows a flow diagram to create the signature file.

FIG. 9 shows the flow chart to create the necessary files of the digital autograph signature (DAS) which is performed when it is determined that the user is satisfied with the text video read from step (260) of FIG. 6, thus beginning the step (271), where through the interface the elements of the signature are shown to the user on the mobile device, which consist of the digital signature, digital video signature and voice video signature, so that later the user in step (272) agrees to end the process.

Once the user has agreed to complete the process, then in step (273) the data for: geolocation is obtained from the mobile device; UID; date; hour; Device Name; brand; model; and interface version, in order to carry out step (274) in which the extension files are generated. Encrypted DAS1 that contains all the information of the signed document. Subsequently in step (275), the .DAS1 file is sent to a "Back-en DAS" server where the information processing is carried out, later, in step (276) all the information generated during the process of digital autograph signature on the mobile device.

Figure 10:
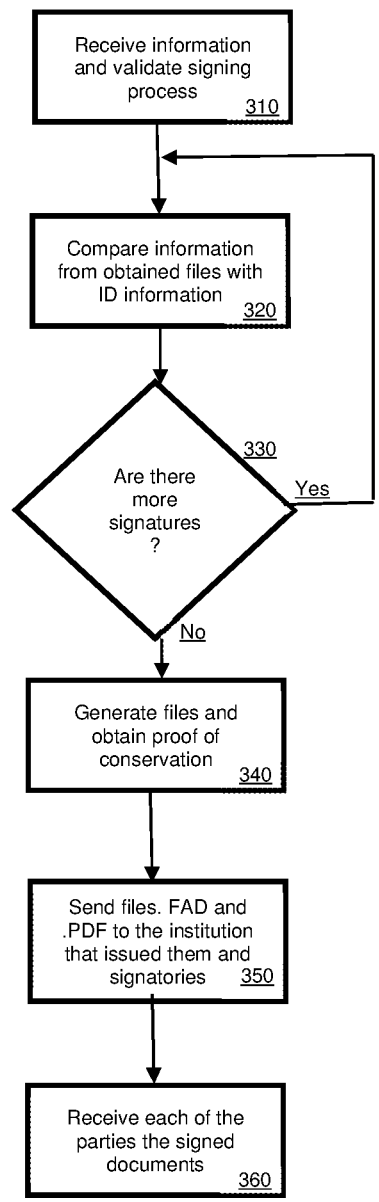
FIG. 10. Shows a flow chart for validate information.

FIG. 10 shows a flow chart with which the information validation process is performed, which corresponds to the process carried out in step (300) of FIG. 1, therefore; of step (275) of FIG. 9, step (310) is carried out, in which the information is received and the signature process is validated, and step (320) is subsequently carried out where the information is compared obtained from the files that were generated, with the information of the user ID occupied in step (131) of FIG. 4, once the data is compared, step (330) is carried out, in which it is determined if there are more people that they are going to sign the document, that in the case that if there are more people the process is repeated from step (320) until all the signatories have signed, in the case that there are no more people to sign, then stage (340) is carried out, which is where the corresponding files are generated and the preservation certificate is obtained, to subsequently carry out stage (350), in which the .DAS and .PDF files are sent to the institution that issued them as well as to each of the signatories, to subsequently carry out the stage (360) in which the institution that issued the document for signature, as well as each of the signatories, receive a copy of the signed document in .DAS and .PDF format, this in order that said documents are protected and can later When consulted, these documents are sent to the signatories by certified email, while the institution receives them in its infrastructure.

Figure 11:
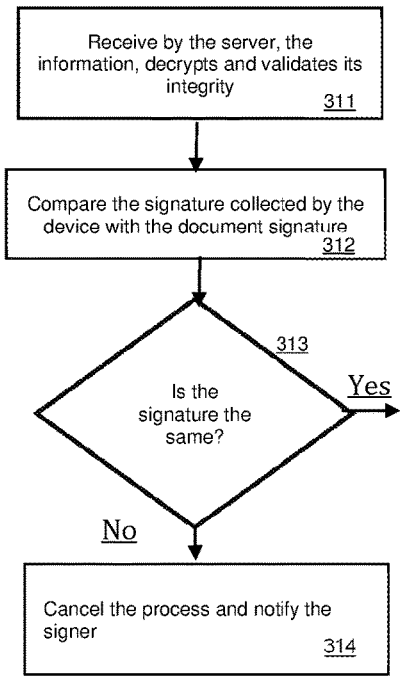
FIG. 11. Shows a flowchart to validate the integrity of the signature.

FIG. 11 shows a flowchart to validate the integrity of the signature that corresponds to step (310) of FIG. 10, so from step (195) (of FIG. 5), the step is performed (311), in which the information generated is received by the "Back-end DAS" server, it is decrypted and subsequently the integrity of the information is validated, and when finished, the signature collected by the device is compared with the signature of the signer ID document, once said information is compared, then it is determined if the signature is the same, which is done in step (312), in the event that it is not the same signature, then the step (314), where the process is canceled and the signer is given notice.

Figure 12:
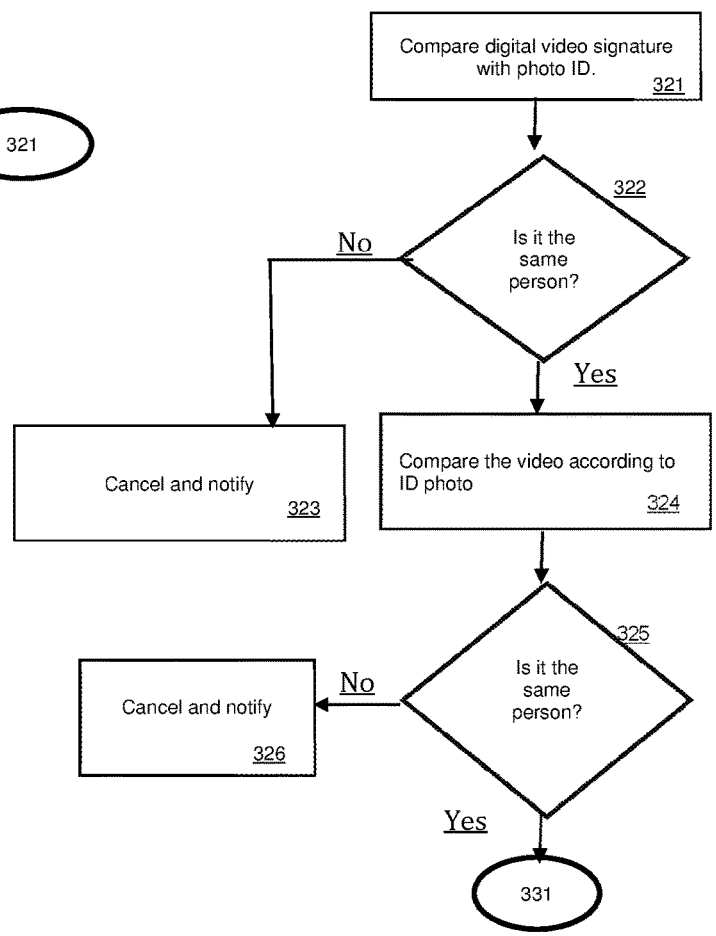
FIG. 12. Shows a flow chart to compare the information of obtained files.

FIG. 12 shows a flow chart for comparing the information of obtained files, so once in step (313) of FIG. 11 it is determined if the signature is the same, then in step (321) it is compared by means of facial biometrics a random piece of the digital signature video frame with the user's ID photograph, to determine in (322) if it is the same person, that in the event that it is not the same person, then the process in step (323) and the signer is given notice, while if (322) it is determined that the signer is the same person, then the video agreement with ID photo by facial biometry is compared in step (324), a random frame of the video signature by voice with the ID photograph, so that with this information in step (325) a second determination is made to identify if it is the same person who is signing, which in the event that it is not the same person, then in step (326) the process is canceled and The signer is given notice.

Figure 13:
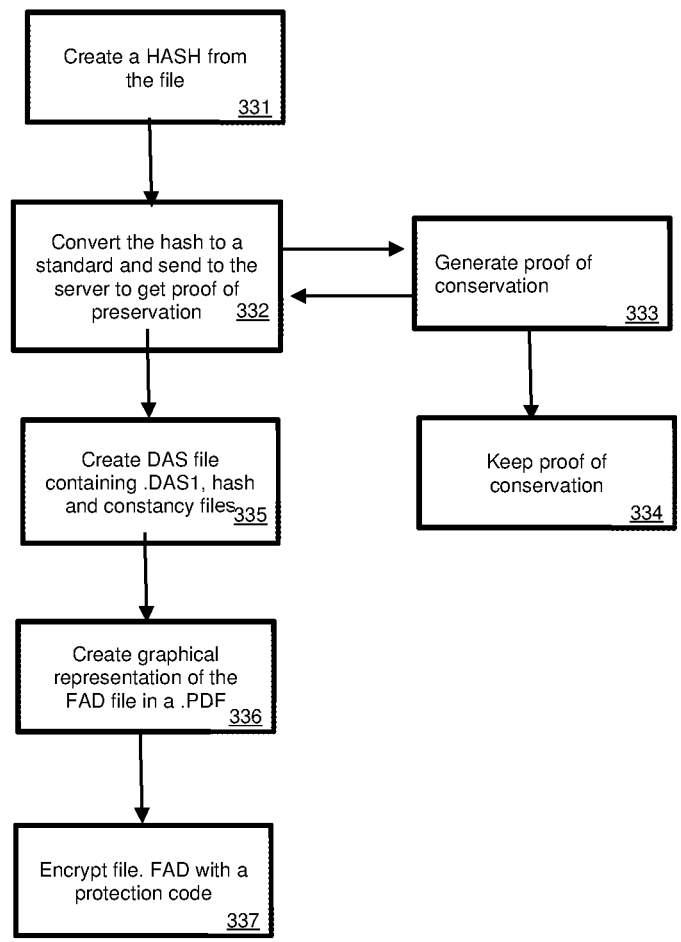
FIG. 13. Shows a flow diagram to certify the signature and distribute the document.

FIG. 13 shows a flow chart to certify the signature and distribute the document, for which this process is carried out from the process of step (330) of FIG. 10, where after step (325) of FIG. 12 , step (331) is carried out, in which a unique and unrepeatable HASH of the file is created, for later, in step (332), the HASH obtained becomes a standard ASN.1, which is sent to a server from a third party which is a server of a certifying institution, so in step (333) the certified institution generates a proof of conservation, and in step (334) the proof of certification is saved in a database of the certified institution. When the certified institution returns the corresponding information, in step (335) where with the DAS1 file; the HASH and the constancy of preservation, a file with a unique name of extension DAS is created. once the .DAS file is obtained, in step (336) a .PDF file is created, which is a graphical representation of the .DAS file, while in step (337), the .DAS file is encrypted to increase the security, such encryption is done with AES (256) and the .PDF file which is protected with a security code.

Figure 14:
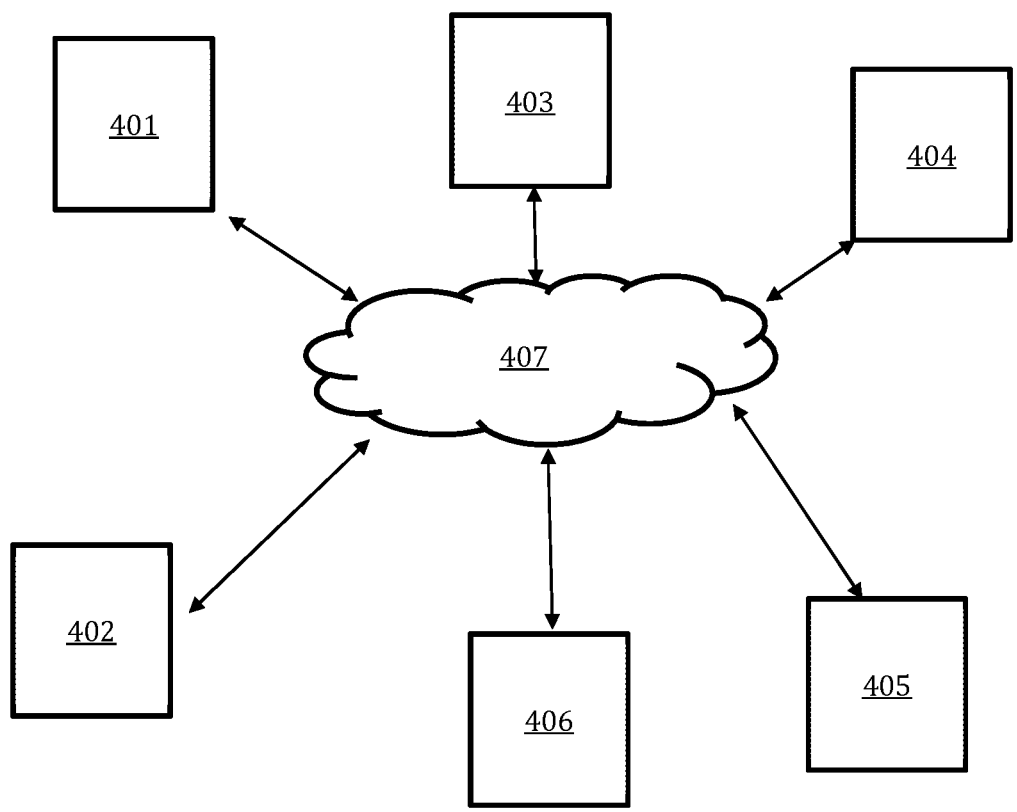
FIG. 14. Shows a schematic diagram of the system.

FIG. 14 shows a schematic diagram of the system (400), where it shows the integration of the system, which can be seen is made up of the mobile device (402), which is the user device where the digital autograph signature (DAS) through the interface found on the device (402), while an administration server (401) is in charge of managing the operation of the system, while (403) shows a portal As an end user, the system has additional servers which are in charge of validating and certifying the process, so in (404) a back-end server is observed where part of the information is going to be processed. an ID document issuing server is also observed in which, at the time, the mobile device sends the information to this server for the validation of the information of the data of the user identification document and thus when returning the information to the mobile device (402), it continues with the process, so in the end the information is sent with a third server, where a process is carried out to obtain a record of conservation, and this in turn saves the information in a database , the previous system is configured to work according to the implementation of the method that is developed to perform the digital autograph signature.

Likewise, and in accordance with the method widely described in this specification, a computer-readable medium is developed which contains the method already mentioned and illustrated in the figures accompanying this description.

With the foregoing, the preferred modalities of the present description have been described with reference to the attached figures, without limiting the foregoing, whereby a person skilled in the art can modify or find alternatives that are within the proximity of the Attached claims and it should be understood that they will naturally fall under the technical proximity of the present description.

The invention claimed is:

1. A method in a system to generate a digital autograph signature, the method comprising the steps of:
    notifying a user, through a mobile device interface, that they have a document that, when accepted, must include a digital autograph signature;
    scanning, through the interface of the mobile device, an identification document of the user;
    determining, through the mobile device interface, if the information that was scanned is correct;
    obtaining, through the interface of the mobile device, the fingerprint of the user who is going to sign;
    taking, through the interface of the mobile device, a photograph of the user who is going to sign, as proof of life;
    comparing, using the interface of the mobile device, the photograph with a photograph of the identification document of the user who is going to sign, to verify that it is the same person and prevent a third person from signing on behalf of the user;
    sending, through the mobile device to a server of the institution issuing the identification document, the results of the comparing step to validate the user's identity;
    obtaining, through the interface of the mobile device, the document to be signed, in turn activating a tool to videotape a trace of the user's signature on a screen of the mobile device, as well as a video recording of the user signing the document and a content of the signed document;

displaying, through the interface of the mobile device, the user's signature, as well as elements of the signature on the screen of the mobile device;

creating, through the interface of the mobile device, files encrypted with the information of the signed document and sending said information to a digital autograph signature back-end server (DAS back-end server);

comparing, by means of the DAS back-end server, the information of the files with the information of the user's identification document;

comparing, through the DAS back-end server, using facial biometrics, if the user and the identification document are the same person;

creating, by means of the DAS back-end server, a joined hash, and convert said hash into an abstracts syntax notatbn one (ASN.1) standard to send it to a third server to obtain a certification certificate, the third server saving a copy of the certification certificate in a database;

creating, by means of the DAS back-end server, a file with a unique name of .DAS extension and later, based on the file with the .DAS extension, a file with a portable document format extension (.PDF extension) is created, likewise, the .DAS file is encrypted and the .PDF file is protected with a security code;

sending the .DAS and .PDF files through the DAS back-end server to the institution issuing the identification document and to at least one signing user.

2. The method in a system to generate a digital autograph signature as in claim 1, further comprising the step of canceling the process through the interface of the mobile device, when after notifying the user of the document that must incorporate the autograph signature, the user commits three failures in the attempt to enter.

3. The method in a system to generate a digital autograph signature as in claim 1, further comprising the step of canceling the process through the interface of the mobile device, and advising when in the step of comparing the photograph with the photograph of the identification document determines that the person in the photograph is not the same person as the identification documents.

4. The method in a system to generate a digital autograph signature as in claim 1, further comprising the step of canceling the process through the interface of the mobile device, when the information with the issuing institution of the identification document is not correct, otherwise, the user is advised that they can continue with the signature.

5. A system for generating a digital autograph signature comprising:

a mobile device;
an institution server issuing an identification document;
a digital autograph signature back-end server (DAS back-end server); a third server that issues a certification certificate; wherein the mobile device, through an interface, is configured to:
notify a user who has a document that, upon acceptance, a digital autograph signature must be incorporated;
scan an identification document of the user;
determine if the information that was scanned is correct;
obtain a fingerprint of the user who is going to sign;
take a photograph of the user who is going to sign, as proof of life;
compare the photograph with the photograph of the identification document of the user who is going to sign, to verify that it is the same person and prevent a third person from signing on behalf of the user;
send to a server of the institution issuing the identification document, the results of the comparing step to validate user's identity;
obtain the document to be signed, in turn activating a tool to videotape a trace of the user's signature on a screen of the mobile device, as well as a video recording with the user signing the document and a content of the signed document;
display the user's signature, as well as elements of the signature on the screen of the mobile device;
create encrypted files with the information of the signed document and send said information to the DAS back-end server;
the DAS back-end server is configured to:
compare the information in the files of the signed document with the information in the user's identification document;
compare using facial biometrics if the user and the identification document are the same person;
create a joined hash and convert said hash into an abstract syntax notation one (ASN.1) standard to send to a third server to obtain a certification certificate, the third server saving a copy of the certification certificate in a database;
create a file with a unique name of extension .DAS and later on the basis of the file with extension .DAS a file with portabie document format extension .PDF extension) is created, likewise, the .DAS file is encrypted and the .PDF file is protected with a security code;
send the .DAS and .PDF files to the institution issuing the identification document and at least one signing user.

6. The system to generate a digital autograph signature as in claim 5, wherein the mobile device, through the interface, cancels the process, when after notifying the user of the document that the autograph signature must be incorporated, the user commits three failures in the login attempt.

7. The system to generate a digital autograph signature as in claim 5, wherein the mobile device, through the interface, cancels the process and warns when, in the step of comparing the photograph with the photograph of the identification document, it is determined that the person with the photograph is not the same person as the identification document.

8. The system to generate a digital autograph signature as in claim 5, wherein the mobile device, through the interface, cancels the process when the information with the issuing institution of the identification document is not correct, in the case, otherwise, the user is advised that they can continue with the signature.

9. A non-transitory computer-readable medium that contains a method to generate a digital autograph signature that is performed by a system comprising the steps of:
notify a user who has a document that, upon acceptance, a digital autograph signature must be attached to it;
scan an identification document of the user;
determine if the information that was scanned is correct;
obtain, through the interface of the mobile device, a fingerprint of the user who is going to sign;
take a photograph of the user who is going to sign, as proof of life;
compare the photograph with the photograph of the identification document of the user who is going to sign, to verify that it is the same person and prevent a third person from signing on behalf of the user;

send to a server of the institution issuing the identification document, the results of the comparing step to validate the user's identity;

obtain the document to sign, activating in turn a video tool to record a trace of the user's signature on a screen of the mobile device, as well as a video recording with the user signing the document and a content of the signed document;

display the user's signature, as well as elements of the signature on the screen of the mobile device;

create encrypted files with the information of the signed document and send said information to a digital autograph signature back-end server (DAS back-end server);

compare the information in the files of the signed document with the information in the user's identification document;

compare using facial biometrics if the user and the identification document are the same person;

create a joined hash and convert said hash into an abstract syntax notation one ASN.1) standard to send it to a third server to obtain a certification certificate, the third server saving a copy of the certification certificate in a database;

create a file with a unique name of extension .DAS and later on the basis of the file with extension .DAS, a file with portable documnet format extension (.PDF extension) is created, likewise, the .DAS file is encrypted and the .PDF file is protected with a security code;

send the .DAS and .PDF files to the issuing institution and at least one user signing.

\* \* \* \* \*